United States Patent Office 3,505,761
Patented Apr. 14, 1970

3,505,761
TREE SUPPORT
Jean Prieur, 5950 38th Rosemount Ave.,
Montreal, Quebec, Canada
Filed Sept. 15, 1967, Ser. No. 668,095
Int. Cl. A01g 17/14; A44b 21/00; F16i 3/12
U.S. Cl. 47—43                    1 Claim

ABSTRACT OF THE DISCLOSURE

The invention consists of a tree support in which the belt encircling the tree trunk and fastened to a stake is made of inert non-wettable material which prevents the growth of microorganisms at the point of contact of the belt with the tree trunk.

---

This invention relates to a tree support of the type comprising a flexible belt adapted to encircle a tree trunk and to be connected to a stake so as to support the tree trunk especially during the early growth years of the tree in order to encourage the tree to grow straight.

In the conventional tree supports of this type, the belt is usually made of fabric such as cotton webbing. The fabric has the tendency to retain moisture and is therefore usually conducive to growth of microorganisms harmful to the tree and also encourages insects to nest at the point of contact of the belt with the tree. Such insects and especially their larvae may also be harmful to the young tree.

The present invention proposes to overcome these disadvantages by providing a tree support in which the belt is made of inert non-wettable material such as plastic. According to a further feature of the invention the belt has ribbed edges which give it a certain rigidity so that when the belt is mounted around a tree trunk it will form essentially a circle. The dimensions of the circle will preferably be somewhat larger than the diameter of the tree trunk thereby minimizing the point of contact of the tree trunk with the belt, thus further discouraging the development of noxious organisms. This arrangement is in contact with the conventional cotton webbing which is normally in contact with more than half of the circumference of the tree trunk.

Figure 1:
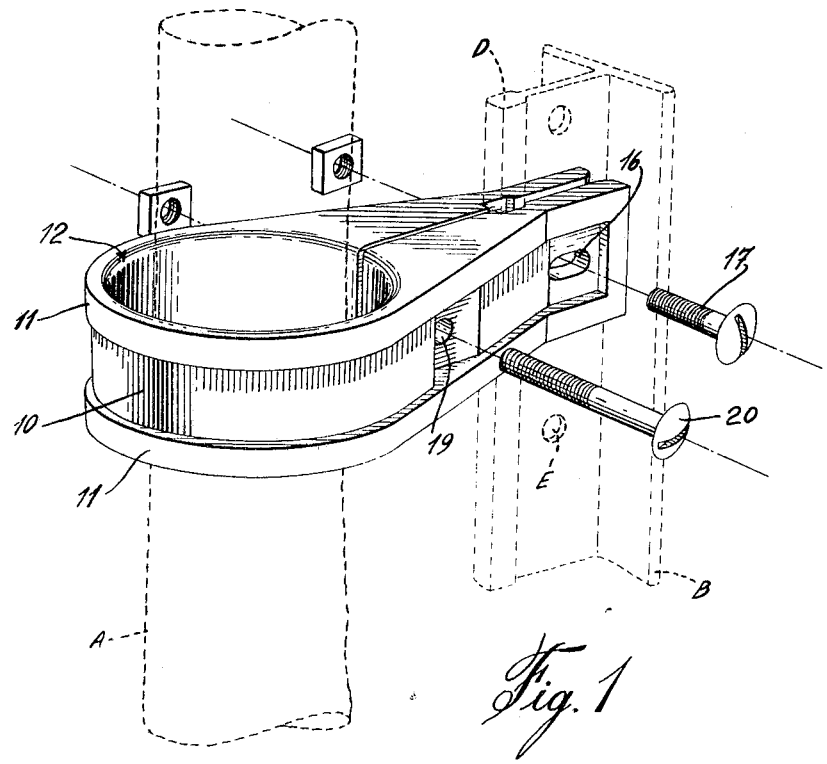
Figure 2:
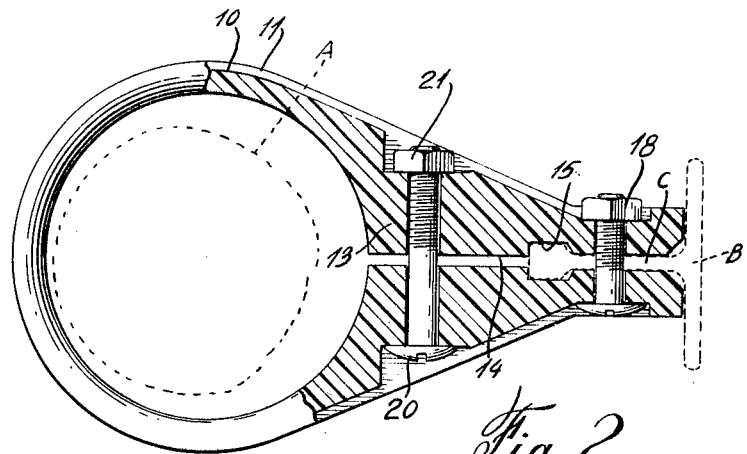

A preferred embodiment of the invention is illustrated by way of example in the accompanying drawings in which:

FIGURE 1 is a perspective view of the tree support according to the invention mounted around a tree trunk and connected to a stake, the trunk and the stake being shown fragmentarily; and FIGURE 2 is a plan of the tree support.

With reference to the drawings, the tree support according to the invention comprises a belt 10 of flexible inert non-wettable material such as non-porous plastic.

The central tree-encircling portion of the belt 10 has ribs 11 outwardly projecting from its upper and lower edges, the inner side of the edges being rounded as indicated at 12.

The ribs 11 give the belt a certain rigidity so that when it is bent around a tree trunk indicated at A it forms essentially a circle as shown in FIG. 2 for the purpose of minimizing contact with the tree trunk as explained above.

The belt 10 may be made in various sizes to fit tree trunks of various diameters and the size selected for any particular tree trunk will be such that a space is provided between the tree trunk and the belt.

The belt 10 has integral thickened portions 13 near its ends which are shaped so as to complete the circle defined by the belt 10 in its mounted position.

The thickened portions 13 provide in mounted position flat mating surfaces 14. Opposite grooves 15 are provided in the surfaces 14, the grooves being adapted to fit a stake B of T-shaped cross-section the central flange C of which terminates in a rib D at its outer edge. The mating of the grooves 15 with the rib D has the effect of primly holding the support in a horizontal position.

The ends of the belt 10 are provided with holes 16 through which passes a bolt 17 with a nut 18 for securing the support to the stake B, the flange C of which has a number of holes E at various heights to receive the bolt 17 thereby enabling the support to be mounted at a suitable height along the tree trunk.

The thickened portions 13 of the belt 10 are also provided with mating holes 19 which receive a bolt 20 with with a nut 21 to maintain the belt in tree-encircling positions. The bolts 17 and 20 cooperate to hold the grooves 15 tightly against the edge rib D of the stake B.

I claim:

1. In combination, a tree support and a stake, the said stake having a T-shaped section formed by three flanges, one of the flanges having a bead along its free edge and a hole therethrough, the said support comprising a belt made of an inert non-wettable plastic material to encircle a tree trunk in a mounted position, the portion of the belt encircling the trunk having rounded edges, the said belt having thickened portions near its ends shaped to complete the circle defined by said belt around the trunk, the said thickened portions provided with flat mating surfaces in the mounted position and opposite grooves in said surfaces for fitting the said one flange and said bead, a pair of mating holes through said thickened portions and a bolt passing through said holes to maintain said belt in a tree-encircling position and another pair of mating holes provided through said belt ends and another bolt passing through said additional holes and through the hole in the said one flange of the stake, the said grooves and bead extending perpendicularly between the two pairs of holes.

References Cited

UNITED STATES PATENTS

| 366,532 | 7/1887 | Tuerk | 24—279 |
|---|---|---|---|
| 1,633,090 | 6/1927 | Gilman | 47—42 |
| 2,872,141 | 2/1959 | Hefner | 24—279 XR |
| 2,963,252 | 12/1960 | Caporicci | 248—229 |
| 3,010,256 | 11/1961 | Ise | 47—42 |

FOREIGN PATENTS 1,210,411   9/1959   France.

ROBERT E. BAGWILL, Primary Examiner

U.S. Cl. X.R.
24—81, 279; 248—74, 229